UNITED STATES PATENT OFFICE.

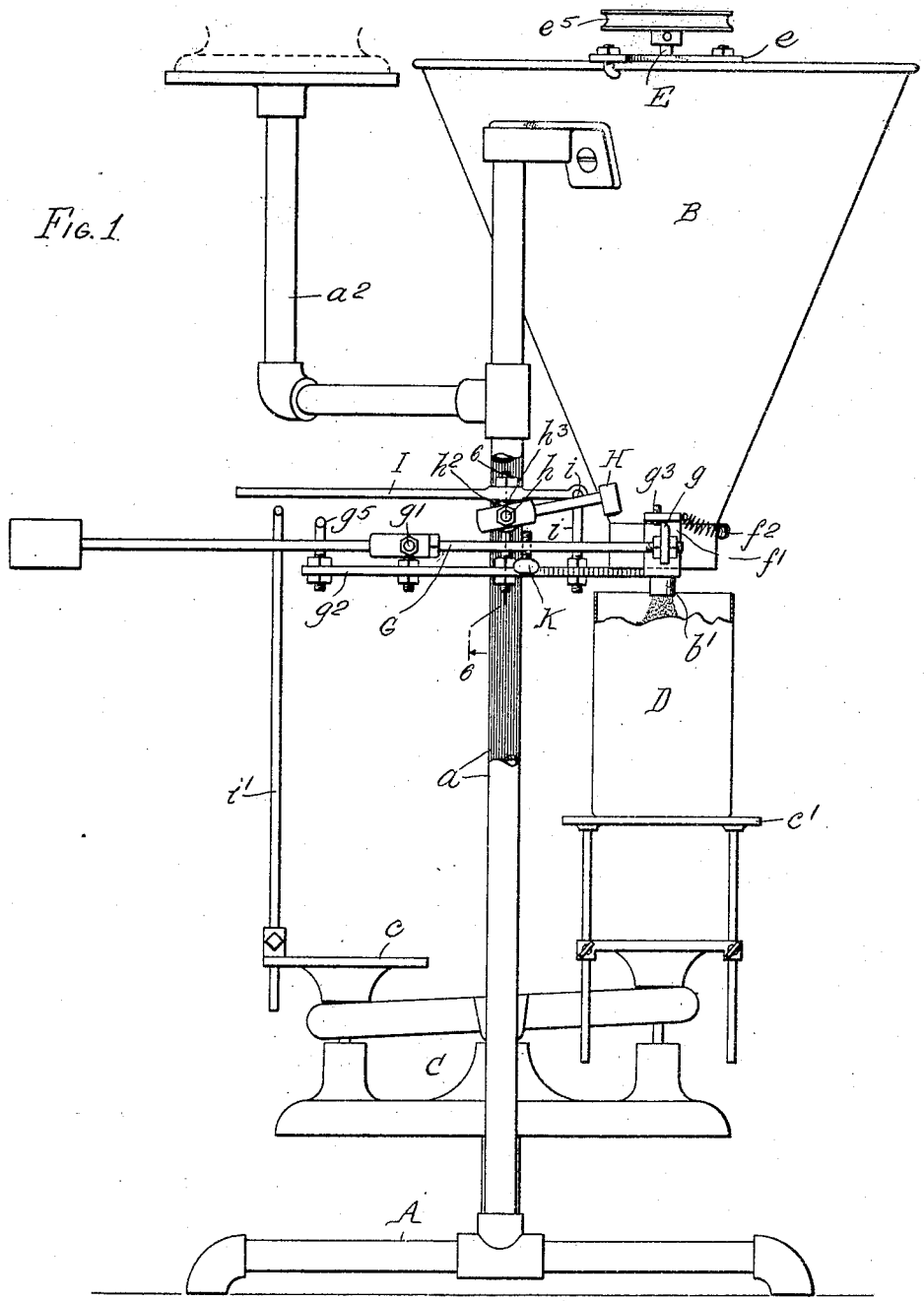

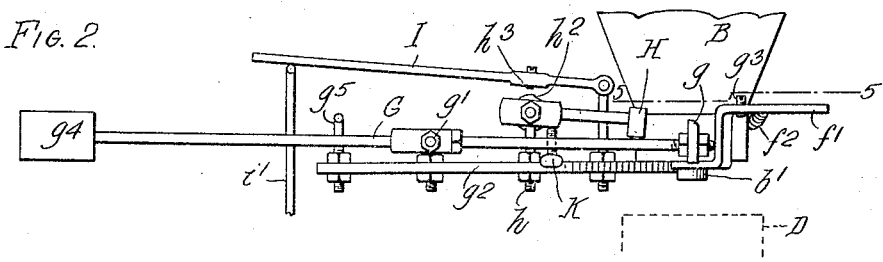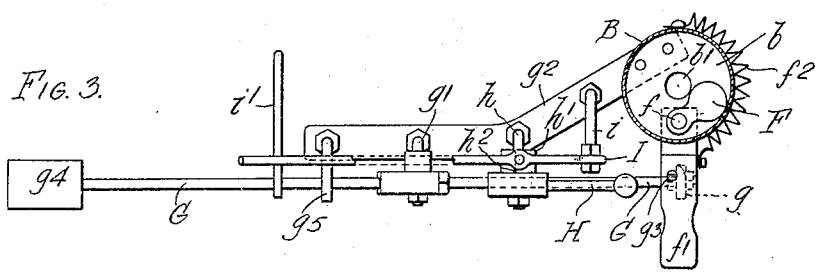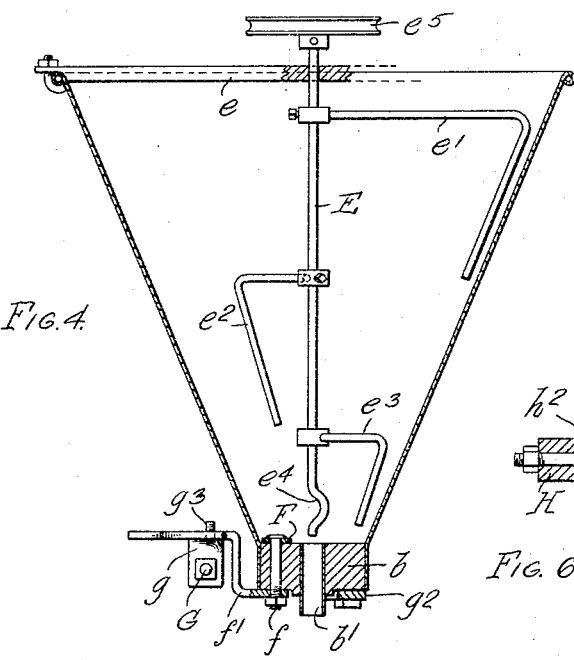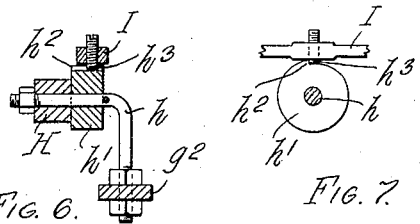

FRANK B. CHAMBERS, OF BUFFALO, NEW YORK.

VALVE-ACTUATING MECHANISM FOR DISPENSING OR WEIGHING APPARATUS.

1,296,921.  Specification of Letters Patent.  Patented Mar. 11, 1919.

Application filed October 17, 1917. Serial No. 197,167.

*To all whom it may concern:*

Be it known that I, FRANK B. CHAMBERS, a citizen of the United States, residing at Buffalo, in the county of Erie and State of New York, have invented a new and useful Improvement in Valve-Actuating Mechanism for Dispensing or Weighing Apparatus, of which the following is a specification.

This invention relates to mechanism for actuating the valve of a weighing or dispensing apparatus for closing the valve which controls the flow of material when the desired amount of material has been discharged.

The objects of the invention are to provide a mechanism of this kind of improved construction, which is easily tripped to cause the closing of the valve and which can be easily set in the valve opening position; also to provide a mechanism of this kind with a tripping device for moving the valve holding means out of its engaging position and in which the tripping device is automatically restored to the position from which it is adapted to trip the valve holding means; also to improve the construction of mechanism of this kind in the other respects hereinafter specified.

In the accompanying drawings:—

Figure 1 is a front elevation of a weighing apparatus provided with a valve operating mechanism embodying the invention.

Fig. 2 is a front elevation of the valve operating mechanism showing the parts thereof in different positions, and showing a part of the hopper of the apparatus.

Fig. 3 is a top plan view thereof.

Fig. 4 is a vertical sectional elevation of the hopper and the valve for controlling the discharge of the material therefrom.

Fig. 5 is a sectional plan view thereof on line 5—5, Fig. 2.

Fig. 6 is a fragmentary sectional elevation thereof on an enlarged scale, on line 6—6, Fig. 1.

Fig. 7 is a fragmentary elevation of a trip retaining detent of the mechanism.

The mechanism as shown in the accompanying drawings is applied to an apparatus for weighing non-liquid or dry material, but it is not intended thereby to limit the mechanism to be used either with a weighing apparatus or with an apparatus for operating on non-liquid material, since the mechanism can be used equally well on dispensing apparatus of other kinds and can also be used for weighing or dispensing liquids.

The apparatus shown in the accompanying drawings in connection with which the valve operating mechanism embodying the invention is employed, comprises a frame having a base or foot portion A and upright frame members $a$ extending upwardly from the base and supporting a hopper or container B for the material which is to be measured, and a bracket $a^2$ on which a motor or other device (not shown) may be mounted for actuating the agitating means in the hopper. At the lower portion of the frame member, a weighing scale C is secured having a pan $c$ for the weights and a pan or platform $c'$ adapted to support the containers D into which the material is discharged from the hopper. A frame of any other suitable construction may be employed.

The hopper B may be of any desired or suitable construction, that shown being of inverted cone-shape and having a bottom $b$ provided with a discharge spout $b'$ through which the material passes to the container D. The hopper is preferably provided with agitating means of any suitable kind to insure the proper feed of the material from the hopper. In the construction shown for this purpose a substantially upright shaft or rod E is provided which is journaled in a cross member or support $e$ secured to the hopper and which is adapted to be rotated. The member E has a plurality of arms $e'$, $e^2$ and $e^3$ and an off-set portion $e^4$ which stir or agitate the material during the operation of the apparatus, to insure the flow of the material. The rod or shaft is provided at its upper end with a pulley $e^5$ which may be driven from a motor or other suitable device. Any other means for agitating the material may be enployed, or if desired, the agitating means may be entirely omitted.

The flow of material from the hopper B is controlled by means of a valve which, in the apparatus shown, is adapted to be closed by a valve actuating mechanism when the same is tripped by the scale C. The valve in the construction shown comprises a disk or plate F which is secured on an upright rod $f$ pivoted in the base $b$ of the hopper and to which an arm or handle $f'$ is rigidly secured below the base of the hopper so that the valve F can be moved by the arm or handle $f'$ over the opening $b'$ in the hopper or into a position to uncover the opening. The valve is normally held in its closed position by any suitable means, a coil spring $f^2$ being shown in the construction illustrated, which is connected to the handle or arm $f'$ and tends to swing the same into the position shown in Fig. 5, in which the valve or disk F covers the discharge opening in the hopper. A valve of any other suitable construction may be employed in place of the one shown. The arm or handle $f'$ of the valve may be releasably held in a position to uncover the discharge opening in the hopper by means of a detent $g$ mounted on a detent lever G which is pivoted at $g'$ on a supporting member $g^2$ for the valve actuating mechanism, the supporting member being rigidly secured to the hopper. This detent $g$ is adapted to engage with a part on the arm or handle $f'$ to hold the valve F open, a screw or stud $g^3$ being arranged in the handle $f'$ for this purpose. The detent $g$ is held in engaging position with regard to the stud or screw $g^3$ by any suitable means, such for example as a weight $g^4$ on the detent lever G. $g^5$ represents a hook-shaped stop member which is secured on the supporting member $g^2$ and limits the upward movement of the weighted end of the detent lever.

In order to insure accurate measuring or weighing of the material discharged from the hopper, it is necessary that a very slight force exerted by the scale beam should be capable of actuating the detent lever G to cause the detent $g$ to release the arm or handle $f'$ of the valve. For this purpose a trip or actuating mechanism is employed for actuating the detent lever, that shown comprising a trip hammer H which is pivoted on a part $h$ mounted on the supporting bar or member $g^2$ and which is so arranged as to engage the detent lever when released to cause the detent $g$ to be moved out of engagement with the arm or handle $f'$. This trip hammer is provided with a detent portion $h'$, Figs. 6 and 7, having a tooth $h^2$ adapted to be engaged by a tooth or projection $h^3$ formed on a hammer-retaining arm I which is pivoted on a part $i$ of the supporting member $g^2$ for holding the hammer in its set position. The outer end of the arm I is adapted to be engaged by a trip rod $i'$ or other movable portion of the scale. By means of this arrangement the upward movement of the weight pan $c$ will cause the trip rod $i'$ to engage the hammer-retaining arm I and raise the same sufficiently to cause the projection $h^3$ of the arm to be moved out of engagement with the tooth or projection $h^2$ of the trip hammer, thus permitting the trip hammer to drop upon the detent lever G and move the detent $g$ out of engagement with the screw or stud $g^3$ of the valve arm or handle $f'$. The projection $h^3$ is preferably in the form of a screw or stud which is adjustable so that the engagement between the projections $h^2$ and $h^3$ may be made finer or coarser, as may be desired. By making the projection $h^3$ small, a very slight pressure on the part of the trip rod $i'$ will cause the actuation of the detent lever.

Means are preferably provided for automatically resetting the trip hammer into its raised position after the valve has been closed. In the construction shown for this purpose the detent lever G is provided with a screw or hammer setting projection K which is preferably in the form of an adjustable screw or plug. When the detent has been moved out of engagement with the arm or handle $f'$ of the valve, the weight $g^4$ swings the detent lever on its pivot $g'$ so as to cause the hammer setting projection K to engage the hammer H adjacent to the pivot $h$ thereof and to move the hammer upwardly so that the projection $h^3$ on the hammer retaining arm I again enters into engagement with the projection $h^2$ of the trip hammer, thus placing the trip hammer in position to again actuate the detent lever G.

In the operation of the apparatus the valve F is opened by hand by moving the handle or arm $f'$ into position to cause the screw or stud $g^3$ thereof to engage the detent $g$ of the detent lever. When the detent lever G is in this position, the hammer setting projection K thereof is out of engagement with the hammer, so that the hammer is free to drop and strike the lever G. The material then flows into the receptacle on the scale pan, and when a sufficient weight of material has passed into the receptacle the scale is tripped, causing the trip rod $i'$ to actuate the hammer retaining arm I to release the trip hammer, which strikes the detent lever and moves the detent $g$ out of engagement with the arm or handle $f'$. As soon as the arm or handle is disengaged from the detent $g$, it is moved by the spring $f^2$ into a position to close the valve and the detent lever is then free to swing about its pivot $g'$ to cause the hammer setting projection K to reset the trip hammer. The operation is then repeated as soon as the arm or handle $f'$ is moved into the valve opening position into engagement with the detent $g$.

By means of the mechanism described the detent $g$ and stud $g^3$ can be made of sufficient size so that the operator will have no difficulty in causing the two to engage for holding the valve open, thereby increasing the speed at which the machine can be operated. However, by making the detent $g$ and stud $g^3$ of large size, considerable force is required to actuate the detent lever G to disengage the detent and stud but this force is supplied by the trip hammer, which can be actuated by means of a very slight force on the part of the scale. Since the trip hammer is reset automatically, the coöperating holding projections or detents $h^2$ and $h^3$ can be adjusted as fine as may be desired, so that a very slight force exerted by the trip rod $i'$ on the hammer retaining arm I will cause the closing of the valve. This renders the apparatus very accurate and at the same time enables the arm or handle of the valve to be readily placed by the operator into its valve opening position.

I claim as my invention:—

1. The combination of a container, a valve for controlling the flow of material from said container, detent means for holding said valve open, means for closing said valve when released from said detent means, an actuating device adapted to be released from its set position to engage said detent means for causing the same to release said valve, and a connection between said detent means and said actuating device for causing said detent means to return said actuating device to its set position after the same has engaged said detent means.

2. The combination of a container, a valve for controlling the flow of material from said container, detent means for holding said valve open, means for closing said valve when released from said detent means, an actuating device pivotally mounted above said detent means and adapted to be released from a set position to swing about said pivot to engage said detent means and causing the same to release said valve, and a part on said detent means adapted to engage said actuating device for swinging said device about its pivot into its set position after the same has engaged said detent member.

3. The combination of a container, a valve for controlling the flow of material from said container, detent means for holding said valve open, means for closing said valve when released from said detent means, an actuating device pivotally mounted in operative relation to said detent means, and means for releasably holding said actuating device in a set position, said device when released from its set position being adapted to engage said detent means for causing the same to release said valve and said detent means returning said device to its initial position after the valve has been closed.

4. The combination of a container, a valve for controlling the flow of material from said container, a detent lever for holding said valve open, means for closing said valve when released from said detent lever, a hammer pivotally mounted above said detent lever, means for releasably holding said hammer to cause the same to swing about its pivot into engagement with said detent lever for releasing the valve.

5. The combination of a container, a valve for controlling the flow of material from said container, a detent lever for holding said valve open, means for closing said valve when released from said detent lever, a hammer pivotally mounted above said detent lever, an arm for retaining said hammer in a set position, and means for engaging said arm to release the hammer when the desired amount of material has been discharged from said container, and means for returning said hammer into a position to be engaged by said arm after the same has engaged said detent member.

6. The combination of a container, a valve for controlling the flow of material from said container, a detent lever for holding said valve open, means for closing said valve when released from said detent lever, a hammer pivotally mounted above said detent lever, an arm for retaining said hammer in a set position, and means for engaging said arm to release the hammer when the desired amount of material has been discharged from said container, and means on said detent lever adapted to engage said hammer to return the same into a position to be engaged by said arm after said hammer has moved said detent member out of holding engagement with said valve.

7. The combination of a container, a valve for controlling the flow of material from said container, a detent lever for holding said valve open, means tending to swing said detent lever into a position to hold said valve open, a hammer arranged above said detent lever, means for releasably holding said hammer in a set position, means for releasing said hammer to permit the same to engage said detent lever for releasing said valve, and means on said detent lever adapted to engage said hammer, whereby the lever when released will move said hammer into a position to be engaged by said holding means.

8. The combination of a container, a valve for controlling the flow of material from said container, a detent lever adapted to engage a part of said valve for holding the same open, means for closing said valve when released from said lever, a hammer arranged in operative relation to said detent lever to cause the same to disengage said valve, an arm for releasably holding said hammer in a set position out of engagement with said detent lever, means for engaging said arm to release the hammer when the desired amount of material has been discharged from said container, a projection on said detent lever adapted to engage said hammer after said hammer has moved said detent lever out of engagement with said valve, for returning said hammer to its set position, and means tending to swing said detent lever into a position to hold said valve and swing said hammer to its set position.

9. The combination of a container, a valve for controlling the flow of material from said container, a detent lever adapted to engage a part of said valve for holding the same open, means for closing said valve when released from said lever, a hammer arranged in operative relation to said detent lever to cause the same to disengage said valve, an arm having an adjustable part adapted to engage said hammer for holding said hammer in a set position out of engagement with said detent lever, and means for engaging said arm to release said hammer when the desired amount of material has been discharged from said container.

Witness my hand this 16 day of October, 1917.

FRANK B. CHAMBERS.

Witnesses:
F. E. PROCHNOW,
M. J. PITMAN.

Copies of this patent may be obtained for five cents each, by addressing the "Commissioner of Patents, Washington, D. C."